United States Patent
Soni et al.

(10) Patent No.: US 10,528,987 B2
(45) Date of Patent: Jan. 7, 2020

(54) SYSTEMS AND METHODS FOR PROVIDING REAL-TIME MARKETING CAMPAIGNS

(71) Applicant: Adobe Inc., San Jose, CA (US)

(72) Inventors: Sachin Soni, New Delhi (IN); Ashish Duggal, Delhi (IN); Stephane Moreau, L'Hay-les-Roses (FR); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 942 days.

(21) Appl. No.: 14/450,729

(22) Filed: Aug. 4, 2014

(65) Prior Publication Data

US 2016/0034973 A1  Feb. 4, 2016

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0276* (2013.01); *G06Q 30/0269* (2013.01); *G06Q 50/01* (2013.01)

(58) Field of Classification Search
CPC .................................. G06Q 30/0276
See application file for complete search history.

(56) References Cited

U.S. PATENT DOCUMENTS

| | | | |
|---|---|---|---|
| 8,515,828 B1* | 8/2013 | Wolf | G06Q 30/02 705/26.1 |
| 2006/0200341 A1* | 9/2006 | Corston-Oliver | G06F 17/274 704/5 |
| 2011/0246574 A1* | 10/2011 | Lento | G06Q 10/10 709/204 |
| 2013/0041837 A1* | 2/2013 | Dempski | G06Q 10/101 705/345 |

* cited by examiner

*Primary Examiner* — Bennett M Sigmond
*Assistant Examiner* — Scott C Anderson
(74) *Attorney, Agent, or Firm* — Kilpatrick Townsend & Stockton LLP

(57) ABSTRACT

Systems and methods for providing real-time marketing campaigns are disclosed. One disclosed method includes steps of identifying, by a marketing system, a target product for a marketing campaign; executing a real time capture system to requesting and receiving, by a real-time capture system, user comment information from one or more social media sites; determining, by a sentiment engine, sentiments associated with the user comment information about the target product; and identifying, by the marketing system, one or more features of the target product associated with the sentiments and a target population for the marketing campaign based on the user comment information.

18 Claims, 10 Drawing Sheets

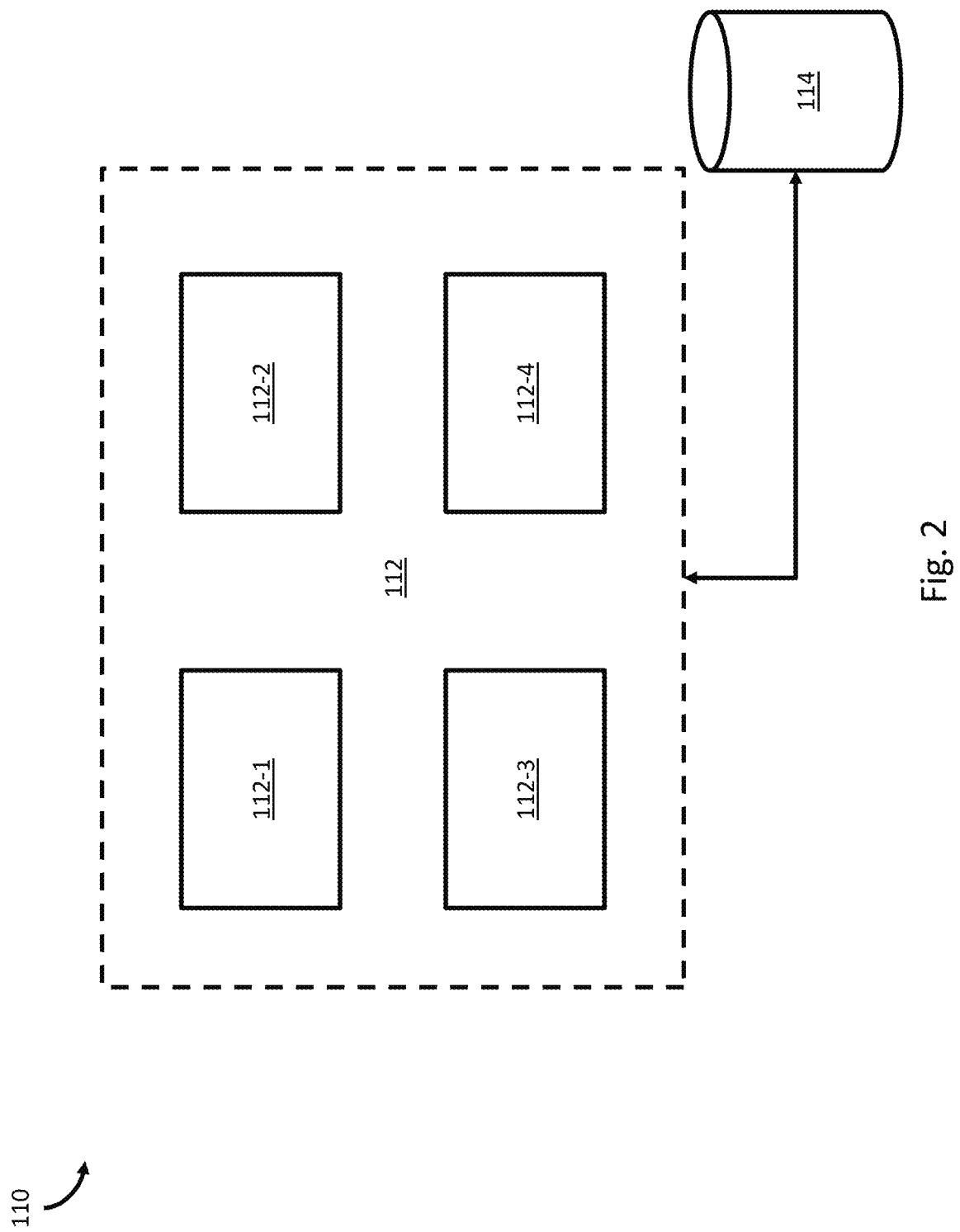

| Keyword | Relevance | Sentiment |
|---|---|---|
| somewhat bad audio | 0.958812 | negative |
| beautiful display touch | 0.844952 | positive |
| time worth buying | 0.825709 | positive |
| great camera | 0.649576 | positive |
| right decision | 0.626822 | positive |

Fig. 5

SYSTEMS AND METHODS FOR PROVIDING REAL-TIME MARKETING CAMPAIGNS

FIELD OF THE INVENTION

The present disclosure generally relates to conducting marketing campaigns based on real-time social media-based user content, and more specifically relates to systems and methods for providing real-time marketing campaigns.

BACKGROUND

Companies seek to market their products to consumers as effectively as they can. For example, to market a camera product, a company may identify a group of consumers that are amateur photographers by obtaining information from a photography club or from students in a photograph course at a university. The company can then create marketing materials describing its new camera product that are targeted to amateur photographers and send those materials to the identified group of consumers. However, in some cases, it can be difficult to determine which consumers may be interested in a product, and then, which features of the product should be emphasized or deemphasized. In addition, consumers interests in a particular product, or features of the product, may change over time, which may affect the effectiveness of previously-created marketing materials. Thus, it may be difficult to plan and execute a marketing campaign without knowing current consumer sentiment about a product and without being able to update marketing materials as consumer sentiment changes over time.

SUMMARY

Systems and methods for providing real-time marketing campaigns are disclosed. One disclosed method includes the steps of identifying features of a product to be marketed, gathering user comments regarding the product and its features, determining consumer sentiments about the product and its features based on the user comments, generating and transmitting marketing materials based on the consumer sentiments, and iterating the steps of gathering additional user comments and updating consumer sentiment information in real-time to update marketing communications to track changing user sentiment.

This illustrative embodiment is mentioned not to limit or define the invention, but rather to provide an example to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 1-2 show systems for providing marketing campaigns according to certain exemplary embodiments;

FIG. 5 shows a sentiment analysis according to certain exemplary embodiments.

DETAILED DESCRIPTION

Figure 1:
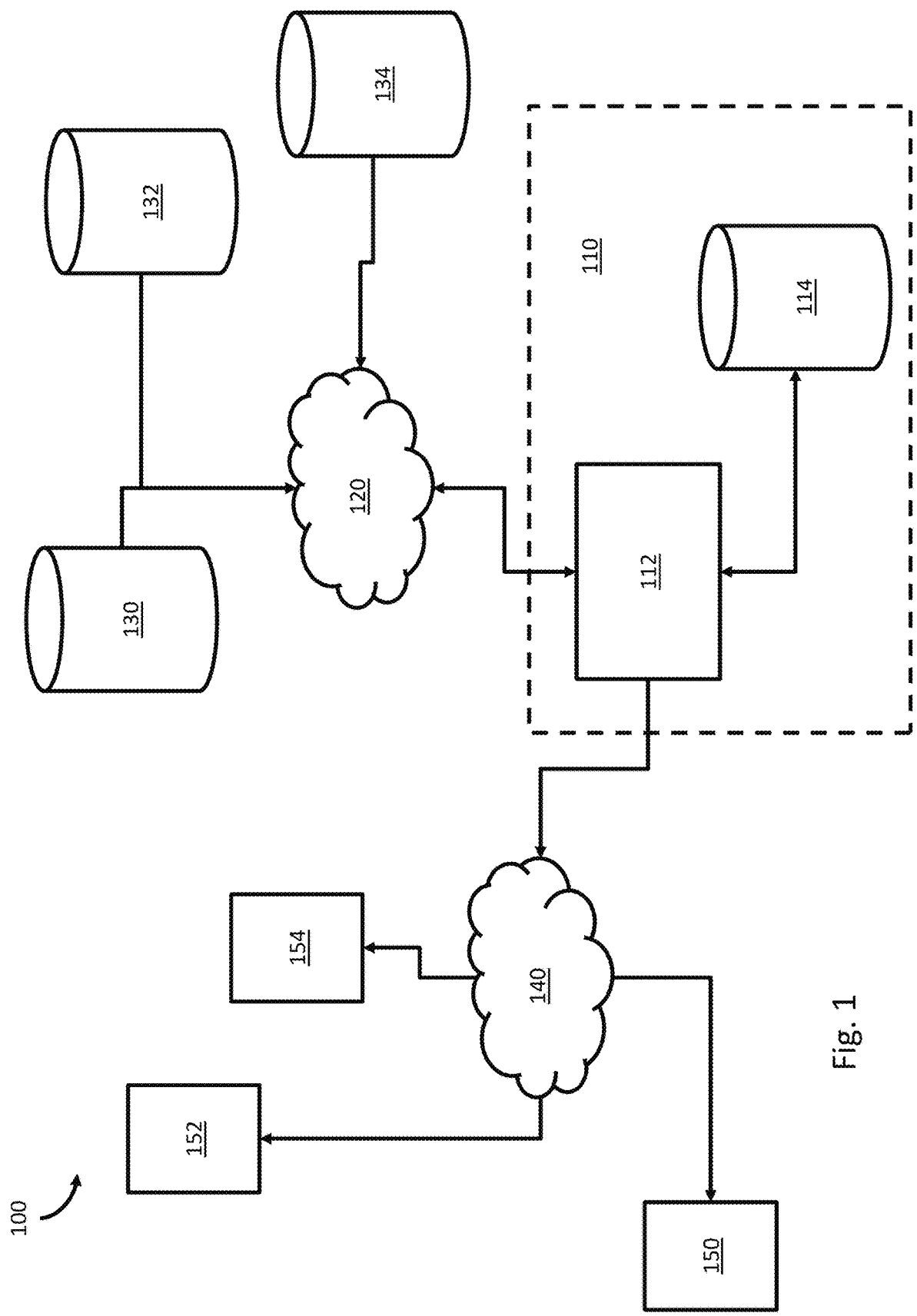

Example embodiments are described herein in the context of systems and methods for providing real-time marketing campaigns. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System for Providing Real-Time Marketing Campaigns

To provide effective, timely marketing information to potential consumers, it can be desirable to understand how potential consumers are discussing the products to be marketed to them. For example, if a company launches a new camera product with a 24 megapixel sensor, 1080 p video recording capabilities, and WiFi capabilities, it may be desirable to providing marketing information highlighting features of the camera that may be of particular interest to interested customers. If the addition of WiFi capability to a camera generates interest to a group of customers, such as customers in a particular demographic, a marketer might desire to emphasize WiFi in marketing materials targeted to members of that demographic. Or if customers dislike the 1080 p video recording quality, a marketer may deemphasize the video recording aspects, while emphasizing other aspects of the camera. Further, these consumer preferences may change over time.

For example, if the camera initially has a software bug that corrupts recorded video files, which generates a significant negative reaction by customers and potential customers, a marketer might deemphasize the video recording aspects of the camera. But later, if updated video recording software is provided to fix the software bug, and sentiment toward the video recording capabilities changes, the marketer might wish to harness the positive sentiments about the software fix and emphasize the "improved" video recording capabilities of the camera. However, it can be difficult to accurately assess customer sentiment about a new or upcoming product.

Embodiments according to the present disclosure seek to assess public sentiment about marketable products by capturing information posted to various social media Internet sites, such as Facebook, Twitter, etc., and using that information to tailor marketing communications and send them to the right target populations. By collecting comments regarding a particular product of interest, a marketer may be able to assess consumer sentiment regarding the product and, if some of the collected comments highlight particular features of the product, identify those features that are generating discussion, whether positive or negative, about the product.

The gathered comments may then be analyzed for the commenter's sentiment to identify whether the comments praise or disparage the product or its features. In addition, information about the commenters may be used to identify demographic information associated with the comments, and thus to generate information regarding how different demographics view the product and its features. For example, considering the camera example, potential consumers in the 19-29 year age range may comment positively about the high-resolution 24 megapixel camera sensor, while the 45-54 year age range may show strong positive feelings about the convenience of the WiFi capabilities. Thus a marketer may be able to generate and provide different marketing materials to different groups of potential customers based on their demographics.

Continuing this example, the marketer may generate targeted email messages using one or more database of potential customers' email addresses, demographics and/or other information. For potential customers in the 19-29 year age range, the marketer may generate an email with a subject line that states "Stunning New 24 Megapixel Camera from XYZ Camera Company" or otherwise highlights that feature, while, for potential customers in the 45-54 year age range, the marketer may generate an email with a subject line that states "Convenient WiFi Connectivity in New Camera from XYZ Camera Company" Or otherwise highlights that feature. In addition, when generating these emails, the marketer may also choose to avoid mentioning or much discussion of features about which there has been significant negative commentary. Thus, while email messages to the 45-54 year age range may emphasize the WiFi capabilities, and might mention the 24 megapixel camera sensor, it may omit discussion of the buggy 1080 p video recording functionality.

However, because in some embodiments user comments may be continuously gathered from one or more social media Internet sites, once the software update to resolve the buggy 1080 p video recording is released, and user comments begin to view the update and the video recording functionality positively, the marketer may revise later marketing emails, or even revise dynamic content referenced by previously-transmitted emails, to include information regarding the 1080 p video recording functionality.

Thus, by retrieving and analyzing user-generated comments in real-time from one or more social media Internet sites, a marketer or marketing organization may be able to generate more relevant, timely, and targeted marketing materials for potential consumers, including targeting demographic groups according to their respective interests as assessed from such comments.

As used herein, the term "marketing system" is used to refer to a computerized system for one or more of managing information about one or more consumers, storing and accessing information about the one or more consumers, targeting one or more of the consumers, planning and executing marketing campaigns, and tracking the performance of marketing campaigns. In some embodiments, a marketing system can employ one or more computer systems in communication with each other to provide the functionality of a marketing system. For example, in one embodiment, a marketing system may include different computer systems for managing information about one or more consumers, for storing and accessing information about the one or more consumers, planning one or more marketing campaigns, executing one or more marketing campaigns, and/or tracking the performance of one or more marketing campaigns. In some embodiments, a marketing system may be embodied entirely within a single computer system. For example, a single application may embody all of the functionality of a marketing system and provide one or more tools (as described below) for performing the functions of a marketing system.

As used herein, the term "marketing campaign" refers to a process that includes identifying a target product(s) to be marketed, identifying a target population to receiving marketing information based on features and characteristics of the target product(s), and generating and sending communications to the target population about the target product(s). For example, in some embodiments, new products may be identified as target products and target populations may be identified based on demographic information about demographics who bought a previous version of the new products, or demographics of those who bought similar types of products. Sending marketing communications can include automatically generating electronic or printed materials about the target product that emphasize interesting features of the target product and may be sent once, or repeatedly over time, to members of the target population. Marketing campaigns can also include obtaining feedback regarding the effectiveness of the marketing campaign and changing the content of communications or the target population(s) based on the feedback.

As used herein, the term "tools" is used to refer to computer-implemented functions, such as applications or procedures, for performing one or more tasks. In some embodiments, tools may provide user interfaces to enable a user to interact with the tool to accomplish a particular task. For example, tools discussed herein include tools for planning a marketing campaign, tools for targeting particular consumers or groups of consumers, executing a marketing campaign, and tracking a marketing campaign. In some embodiments, multiple tools may be incorporated into a single software application. For example, a tool may combine the functionality of aggregating and organizing information about potential consumers and for targeting particular consumers or groups of consumers for a marketing campaign. In some embodiments, multiple applications may work in concert to perform as a tool. For example, a tool for executing a marketing campaign may employ a software application for sending emails, a separate software application for generating marketing materials, and a separate software application for extracting or importing contact information regarding targeted consumers.

As used herein, the term "real time capture system" is used to refer to a computerized system for capturing data from a data source in real time, or near-real-time, or for capturing data from a data source for use in a real-time or near-real-time process, or both. For example, in some embodiments, a marketing system may execute a marketing campaign by, in part, generating and transmitting marketing information to a target population. However, during this process, the real time capture system may capture data relevant to the marketing campaign which causes the marketing campaign to be modified during its execution. Thus, in one embodiment, information sent to one consumer may differ from information sent at a later time to another consumer, or the same consumer, based on information captured by the real time capture system. Further, in some embodiments, a real time capture system may also be configured to request and/or receive data from a data source as the data is generated. For example, in some embodiments, a real time capture system may transmit a request for data to a data source and, as relevant data is generated by the data source, e.g., as users post comments to a social media site, the data source provides the data to the real time capture system.

As used herein, the term "sentiment" is used to refer to an emotion, affinity, or attitude and may refer to an individualized sentiment, e.g., of a single consumer, or to an aggregate sentiment, e.g., of a plurality of consumers. For example, in the context of a marketing system, it may be useful to understand consumer sentiment towards a product to be marketed. Thus, it may be useful to estimate a consumer's attitude or reaction to a product or features of the product. For example, a user may like or dislike a product, or be desirous or indifferent towards a product. Further, sentiments may also include a strength or magnitude. For example, a sentiment may be strong or powerful, or may be weak or tepid. In addition and according to context, "sentiment" may also refer to a measured or calculated value reflecting such an emotion, affinity, or attitude. For example, according to some embodiments, a software application may attempt to calculate a sentiment associated with text. Such a software application may analyze the semantic meaning of the words in a portion of text and calculate a score, such as a positive or negative floating-point value between −1 and 1, though other scales, ranges, or values are within the scope of this disclosure. In addition, in some embodiments, a sentiment may also include a confidence score indicating the determined accuracy of the calculated sentiment. Thus, a sentiment score may have a value of 0.998 indicating a strongly-positive sentiment, however, it may only have a confidence score of 0.6, indicating that while the sentiment is apparently strongly positive, there is uncertainty as to the accuracy of the score, potentially due to ambiguous phrasing, multiple possible senses of one or more words, misspellings, or lack of punctuation.

As used herein, the term "sentiment engine" is used to refer to a software application (or applications) that are configured to calculate sentiments of expressions that have been provided to the sentiment engine. For example, one embodiment of a sentiment may be configured to receive text strings with natural language expressions and to analyze these text strings to calculate a sentiment score for the expressions. Other embodiments may be configured to receive spoken words and calculate sentiment scores for the spoken words and/or phrases. Further, a sentiment engine, in some embodiments, is configured to output data indicating the sentiment score and the associated words or phrases, such as by generating textual strings or binary data streams.

Embodiments according to this disclosure may be advantageously used in combination with one or more marketing systems, such as Adobe® Campaign®, to generate and execute a marketing campaign. A suitable marketing system may include a number of components to assist a marketer or marketing organization with developing and implementing a marketing campaign, particularly in the case of targeted marketing campaigns. A marketing system may include a number of different tools to enable a marketer, or marketing organization, to plan a marketing campaign, select a target consumer group, execute the campaign, and the track the effectiveness of the campaign. These tools may be accessible to the marketer through various graphical user interfaces (GUIs) at a user computer.

An example marketing system usable in conjunction with real-time consumer sentiment analysis includes multiple interconnected components. These components typically include one or more data repositories to store information about potential customers, as well as planning tools, tools for targeting potential customers, tools for executing the campaign, and tools for tracking the progress and effectiveness of the marketing campaign.

FIG. 1 shows an example, typical marketing system 110. The marketing system 110 includes one or more computer systems 112 to allow users to plan and execute marketing campaigns and one or more data stores 114 for storing information about consumers, information about products to be marketed, and information about effectiveness of past marketing campaigns.

The marketing system 110 is connected by a communications network 120 to one or more data providers 130-134. These data providers 130-134 gather and analyze information about individuals for use in marketing campaigns. For example, a data provider may create records for a number of different individuals and store as much known information about them as possible, such as name, address, date of birth, gender, interests, hobbies, friends and family, etc. A marketer or marketing organization may then purchase data from these data providers and import that data into the marketing system's data store 114 for use in planning and executing marketing campaigns, or may access such data from the data providers' databases on an as-needed basis.

A significant component of many suitable marketing systems is the potential customer information. Customer information can be obtained from a variety of different sources and may be stored in multiple data repositories for use by a marketing organization. To provide easier access to what can be a substantial amount of information, some suitable marketing systems include functionality referred to herein as a "customer view." A customer view provides an integrated aggregation of personally-identifiable information ("PII") or other information about a specific individual. Such information can include a name, address, telephone number, email address, social media contact information, friends, family, known likes or dislikes, known hobbies, etc. In short, any data about a customer that can be gathered and stored. This information can then be extracted from the one or more data stores 114, 130-134, integrated into a single profile of the customer, and presented to a marketer for analysis. Or, in some embodiments, the single customer view can be accessed by automated tools to identify particular characteristics, such as demographic information, hobbies, interests, or other information that might be useful when generating a marketing campaign or other marketing materials.

The PII may be obtained in any number of ways, such as by purchasing it from a data aggregator as discussed above, retrieving publicly-available information from the Internet, accessing customer profiles or records maintained by the marketing organization itself, integration with other backend systems like Salesforce, or other information source. In some cases, data may be gathered slowly or piecemeal. For example, a marketing organization may ask visitors to a website to answer a few survey questions. Subsequent visits may sometimes trigger an additional small number of survey questions. In such a way, a user may be willing to provide a small amount of information when they might otherwise be unwilling to respond to a lengthy survey. The marketing system 110 will receive this information and incorporated it into its data store(s) 114.

The marketing system 110 is also connected by an electronic communications network 140 to one or more potential consumers 150-154, such as by email, social media sites or platforms, telephone or other communications method. In some cases, the marketing system 110 may be connected to or in communication with customers and potential customers by non-electronic means, such as by direct mail. These different means of communication are generally referred to as "channels" or "communications channels." The marketing system 110 employs these channels to send marketing information, such as email messages, to the consumers 150-154 with information or offers regarding one or more products or services. Thus, the entire system 100 shown in FIG. 1 provides the marketing system 110 with information regarding consumers, the tools to create and distribute marketing information to those consumers, and the mechanisms by which to pass that information along to the consumers.

As discussed above, a marketing system 110 includes, in addition to the data stores or repositories 114, tools for planning and executing marketing campaigns. FIG. 2 shows some example components of the marketing system 110 of FIG. 1. These tools include planning tools 112-1, tools for targeting particular consumers or groups of consumers 112-2, tools for executing marketing campaigns 112-3, and tools for tracking the effectiveness of a marketing campaign 112-4. These different tools work together to enable a marketer or marketing organization to effectively plan and execute marketing campaigns.

In the embodiment shown in FIG. 2, the planning tool 112-1 allows a marketer to select a product to be marketed, identify the features of the product to be emphasized or promoted, identify characteristics of potential consumers for targeting, select different channels through which to send marketing information, and embed tracking information into marketing communications or related websites. For example, the planning tool 112-1 can provide integrated views of different targeted consumers based on PII acquired from one or more data aggregators, or developed over time by the marketing organization itself. The planning tool 112-1 can also provide graphical tools to enable a marketer to identify products and features to be marketed, and identify demographic groups of interest for a marketing campaign, such as by specifying desirable characteristics of the target consumers.

In addition, the planning tool 112-1 can provide options for different channels through which to send marketing materials, frequencies at which to send materials, and the types of materials to send. For example, one suitable system employs a planning tool 112-1 to allow a user to select from a pool of communication channels such as email, direct mail, text messages, telephone calls, faxes, or Internet advertisements. In addition, a marketer or marketing organization may use the planning tool 112-1 to determine or establish how often marketing messages are communicated. For example, the planning tool 112-1 may include information indicating a change in effectiveness for different communication channels depending on the frequency of communication. If, in one embodiment, email messages sent every two to three days generate more frequent returns, rather than those sent daily or weekly, the planning tool can assist the marketer in selecting the frequency of communication.

In addition, the planning tool 112-1 can assist in determining whether to send coupons, rebates, package offers, or other types of incentives or information as a part of a particular marketing campaign. The planning tool 112-1 also provides tools to create or import marketing messages. For example, a marketer may be able to generate content, such as graphics and text, and subject line information for email messages to be sent as a part of a marketing campaign.

The planning tool 112-1, in some embodiments, may also include functionality that allows the marketer to embed tracking information into such content. For example, when creating content for an email marketing campaign, the marketer may include Internet links (or Uniform Resource Locator or "URL") to an advertised product, but insert a link that takes the user to a page that, in addition to providing the desired information or shopping experience to the user, also transmits information back to the marketer. In addition, the planning tool 112-1 may be capable of generating information to leverage such functionality in third-party web sites, such as Amazon, to enable tracking functionality to track whether the user has clicked on a link in the email message, and whether the user ultimately purchases the advertised product, including more fine-grained information such as whether the user added the product to their "shopping cart," how long the product sat in the cart, and whether the user abandoned the cart, or later removed the product from the cart. Such information may be received by the marketing system and used by a tracking tool 112-4, which is described in greater detail below.

A part of planning a marketing campaign includes selecting the target audience for the campaign, and some suitable embodiments, such as the embodiment shown in FIG. 2, include tools 112-2 for selecting a target population for a marketing campaign. For example, some embodiments may employ relatively simplistic targeting tools to identify potential consumers for inclusion within a marketing campaign. Some such simplistic tools may identify gross categories of PII, such as a broad demographic group, e.g. all women between the ages of 30 to 40. Such a tool may enable a marketer or marketing organization to quickly identify a target population for more generalized marketing information directed to the broad demographic group as a whole. Some embodiments may also employ more customizable control over marketing materials and allow more targeted marketing campaigns.

In some embodiments, the planning tool 112-2 may also comprise functionality to enable a user to adjust a marketing campaign in real time based on information collected from social media sites. As will be discussed in greater detail below, a marketing system 310 may obtain information from social media sites for use with planning a marketing campaign. The information received from the social media sites may affect rankings of particular keywords or may affect the relevance of particular features of a product with respect to different target demographic groups. By providing such information to a user in a graphical display, such as by providing selectable features in a ranked manner, a user may be able to quickly identify a particular target demographic, select one or more features of particular relevance to the demographic based on the social media site information, and thus tailor the marketing campaign appropriately. Further, such functionality may be employed while the marketing campaign is executed to orchestrate the marketing campaign in real time. For example, if a particular feature becomes more relevant to a particular target demographic, the planning tool 112-2 may allow a user to visually detect the increased relevance of the particular feature, and use the tool to incorporate the feature into the marketing campaign with respect to one or more target demographics. Thus, the planning tool may be employed to graphically orchestrate a marketing campaign in real time based on information obtained from one or more social media sites.

The exemplary embodiment shown in FIG. 2 also includes tools 112-3 for executing marketing campaigns once the campaign has been planned and a target population has been selected. The execution tool 112-3 provides functionality to generate and transmit marketing messages to the target population using the channels identified by the planning tool. For example, the execution tool 112-3 may be configured to create email messages based on the content created or imported in the planning tool, or to output print materials for a direct mail marketing campaign. The execution tool 112-3 can also be configured to transmit the email messages to the target population.

Further, the execution tool 112-3 can be configured to schedule periodic transmissions of the marketing information. For example, in one example marketing campaign, the marketer may have developed an initial marketing message, a follow-up message, and a "final offer" message to be sent over the course of two weeks to advertise a sale for a client. The execution tool 112-3 can be supplied with information regarding the timing of particular messages, how to handle "bounceback" messages, such as from an unreachable email address, and the time of day at which to send the messages.

Once a marketing campaign has begun, it can be useful for the marketer or marketing organization to measure the performance of the campaign. Thus, the exemplary embodiment shown in FIG. 2 includes a tracking tool 112-4 that receives, analyzes, and stores tracking information during the course of a marketing campaign. For example, an email sent by the campaign may send tracking information to the tracking tool 112-4 when the email is opened, which the tracking tool 112-4 may store in the repository. In addition, as alluded to above, tracking information may be embedded within web pages corresponding to Internet links within a marketing email, or may be created as a user browses or shops on an Internet site associated with the marketing email.

For example, in some embodiments, a targeted consumer receives an email as a part of the marketing campaign and opens the email, at which time tracking information is sent to the tracking tool 112-4 indicating that the consumer has opened the email and indicating the time the email was opened. The consumer then clicks a URL within the email, which opens the consumer's web browser, or a new tab in the consumer's web browser to navigate the consumer to the selected web page. In this case the web page is part of an online retail store. Information within the URL causes the web page to transmit information to the tracking tool 112-4 indicating the identity of the consumer that clicked on the URL and the time at which the consumer clicked on the URL.

As another example, if the consumer has a user account at the online retail store, information about the consumer may be extracted from the user's account and incorporated into the data store 114. In this example, the URL leads to a web page offering the new camera product for sale, and includes an option to add the camera to the consumer's shopping cart. When the consumer selects an option to add the camera to her shopping cart, the web page sends tracking information to the tracking tool 112-4 indicating that the consumer has added the camera to the shopping cart. Subsequently, the user may remove the camera from her shopping cart, in which case, the web page sends additional tracking information indicating that the consumer has removed the camera from her shopping cart. In such a case, the tracking tool 112-4 stores that information in the data store 114 and may send a message to the execution tool 112-3 to send a further email to the consumer to encourage her to purchase the camera, such as a coupon or discount offer.

Alternatively, the consumer may simply abandon her shopping cart without purchasing any of the items, including the camera. Upon detecting that the consumer has abandoned her shopping cart, with the camera in it, the web page may transmit tracking information to the tracking tool 112-4 to indicate that the consumer has abandoned the purchase of the camera. The tracking tool 112-4 may store this information in the data store 114, and may also transmit a message to the execution tool 112-3 to send a further email to the consumer to encourage her to purchase the camera, such as a coupon or discount offer. In some cases, the consumer may purchase the camera, in which case, the web page may transmit tracking information to the tracking tool 112-4 indicating that the user has purchased the camera, which the tracking tool 112-4 may store in the data store 114.

The tracking tool 112-4, upon receiving various types of tracking information, including those discussed above, may store some or all of such tracking information in the data store 114. The tracking tool 112-4, in some embodiments, includes functionality to allow a user, such as a marketer, to access the tracking information and to request or to generate tracking reports. For example, some embodiments of the tracking tool 112-4 include functionality to allow the marketer to view or determine statistical information regarding the number of consumers contacted by email during the marketing campaign, the number of users who opened the email, the number of users who clicked on a URL in the email, and the number of users who purchased the marketed product. Such statistical information may provide the user, such as the marketer or the marketer's client, with information regarding the effectiveness of the marketing campaign. If a large percentage of targeted consumers purchased the marketed product, the marketer or the marketer's client may be able to more easily replicate the success by adhering to a similar marketing strategy in the future.

Alternatively, if a small percentage of the targeted consumers purchased the product, the marketer may be able to use the tracking information to determine where or why the campaign may have failed. For example, if only a very small number of targeted consumers opened the email, the marketer may be able to revise the types of emails sent or the subject lines of the emails to better capture interest in the email. Alternatively, if a significant number of targeted consumers opened the email, clicked on the link, and added the product to their cart, but ultimately abandoned the shopping cart, the marketer may conclude that the price of the product was too high, and may consider alternative marketing strategies, including rebates or other incentives.

Thus, marketing systems 110, in some embodiments, may provide end-to-end tools for planning, executing, and analyzing the effectiveness of marketing campaigns. And embodiments according to the present disclosure may integrate with such marketing systems 110 to provide enhanced marketing intelligence for planning and executing marketing campaigns, such as by providing real-time information regarding consumers' interests and focuses regarding particular products, which may allow a marketer or marketing organization to better plan a marketing campaign, or to adjust a marketing campaign on-the-fly to keep pace with shifting consumer sentiments.

Figure 3A:
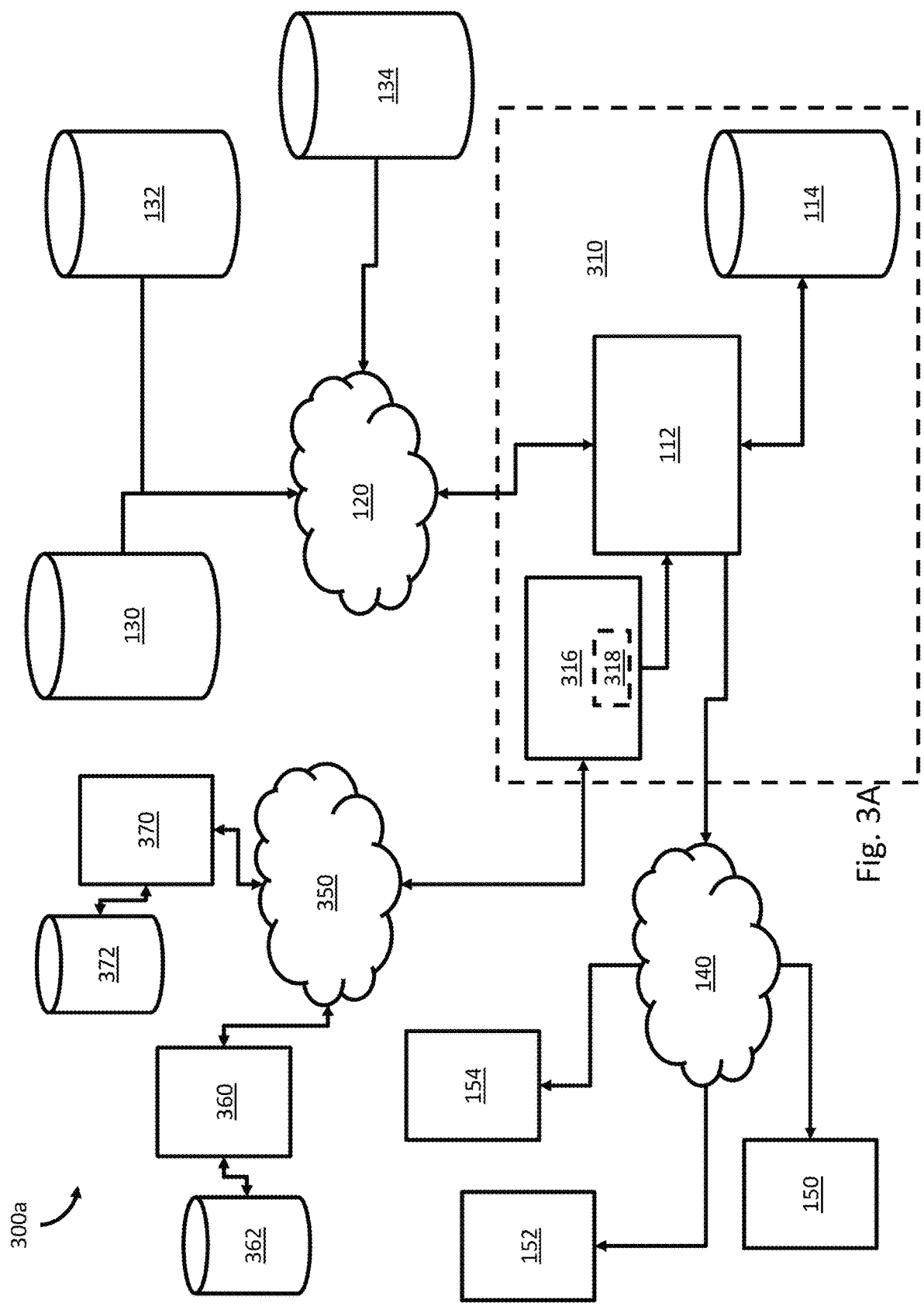
FIGS. 3A-C show systems for providing real-time marketing campaigns according to certain exemplary embodiments.

FIG. 3A shows a system 300a for providing real-time marketing campaigns according to one embodiment. The system 300a includes a marketing campaign system 310, which provides one or more data repository 114 for storing information regarding individuals or other entities, such as businesses, that may be useful in providing targeted marketing information to those persons. The marketing campaign system 310 also includes one or more computer systems 112 for use in planning a marketing campaign, targeting a population of consumers, executing the marketing campaign, and tracking the effectiveness of the marketing campaign as described above with respect to the exemplary systems shown in FIGS. 1 and 2. The system 300a further comprises a real-time capture system 316 for capturing consumer information and sentiment in real-time or near-real-time and providing the consumer information and sentiments to the marketing campaign system 310.

The real-time capture system 316 comprises one or more computers or virtual machines, and is configured to execute program code stored in one or more computer-readable media to execute one or more methods according to this disclosure. In addition, the real-time capture system 316 includes one or more network or communications interfaces for communicating with one or more other computer systems, devices, or networks. The real-time capture system 316 is in communication with the one or more computer systems 112 of the marketing system 310. In addition, the real-time capture system 316 is in communication with one or more networks, including network 350. In some embodiments, the real-time capture system 316 may comprise, or be in communication with, one or more user interface devices, such as a keyboard, mouse, monitor, touch-sensitive input device, touch screen, or other user interface device.

Figure 3B:
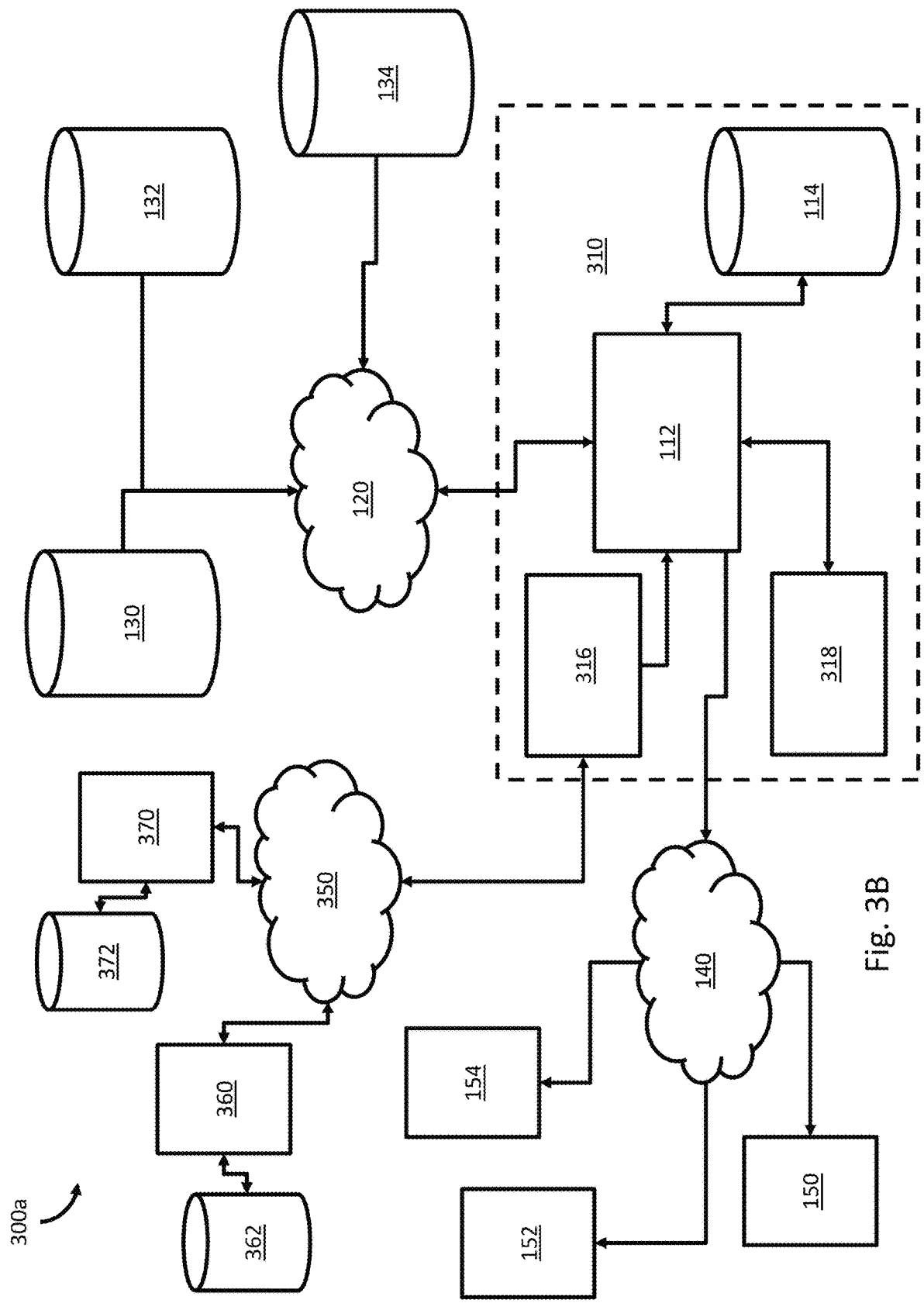

In addition, in the embodiment shown in FIG. 3A, the real time capture system 316 comprises a sentiment engine. As discussed above, a sentiment engine includes a software application (or applications) that is configured to calculate sentiments of expressions that have been provided to the sentiment engine. As shown in FIG. 3A, the sentiment engine may be a part of the real time capture system 316 or may execute on one or more computer systems configured to execute the real time capture system. However, in some embodiments, the sentiment engine 318 may be a separate component in communication with the marketing system 318. For example, FIG. 3B shows one embodiment of a marketing system 310 comprising a sentiment engine 318 that is in communication with the other components of the marketing system, including the one or more computer systems 112 executing the various tools 112-1 to 112-4, as well as the real time capture system 316 and the data store 114. In some embodiments, the real time capture system 316 or one or more of the tools 112-1 to 112-4 may employ, such as by invoking, the sentiment engine 318, such as by providing one or more sets of data to the sentiment engine 318 for sentiment analysis. For example, the real-time capture system 316 may be configured to provide one or more user comments to the sentiment engine 318 that have been received from the one or more social media sites 360, 370.

In some exemplary embodiments, the marketing system 310 also may be in communication with a plurality of social media Internet sites, including Facebook® 360 and Twitter® 370, via network 350. In other embodiments the marketing system 310 may be in communication with additional or other social media Internet sites, such as Instagram®, MySpace®, Snapchat®, Google+®, or others. The social media Internet sites 360, 370 may be in communication with one or more data stores 362, 372 that store comments, pictures, video, apps, or other content provided by the social media site itself or by one or more users of the site. In some embodiments, one or more social media Internet sites 360, 370 provide one or more application programming interfaces (APIs) to enable third parties to access and retrieve information from the social media sites 360, 370, such as individual comments, statistical information about comments or keywords, likes, or other user-generated content, including images and video. Facebook® has recently announced its Keyword Insights API for obtaining statistical information about identified keywords and its Public Feed API for obtaining user comments containing identified keywords. Twitter has a similar set of APIs available, and other social media sites are expected to provide or are already providing similar APIs.

For example, according to one embodiment, the real-time capture system 316 may transmit a query such as the following to the Facebook® third-party API: "SELECT age_gender_results FROM keyword insights WHERE term='Note 3' AND term='camera' AND country='US' since yesterday." In response, the real-time capture system 316 may receive the following information from the Facebook® third-party API:

```
"data": [ {
"age_gender_results": {
"gender": {
"female": 16051,
"male": 15230
},
"user_age": {
"13-17": 8201
"18-24": 7215
"25-34": 7782
"35-44": 4490
"45-54": 2122
"55+": 1471
}}}}}
```

In response to receiving the response to the query, the real-time capture system 316 may store the received information in the data store 114 for use by the marketing system 310.

In this embodiment, the real-time capture system 316 is configured to request information from both Facebook® and Twitter® to assist with planning a new marketing campaign, for selecting one or more sets of target populations, and for generating marketing materials to be sent to the target population. For example, a marketer employing the results of the query above may determine that a marketing campaign directed to the "Note 3" and with a focus on its "camera" may be best targeted towards consumers in the 13-34 year old age range as 75% of the comments posted on Facebook regarding the Note 3's camera are from this age range, irrespective of gender. However, if the real-time capture system 316 transmits a different query, the results may indicate a different consumer group should be targeted. For example, a query such as "SELECT age_gender_results FROM keyword insights WHERE term='Note 3' AND term='handwriting' AND country='US' since yesterday" may return the following results:

```
"data": [ {
"age_gender_results": {
"gender": {
"female": 15823,
"male": 13510
},
"user_age": {
"13-17": 954
"18-24": 2169
```

```
         "25-34": 4761
         "35-44": 6633
         "45-54": 8312
         "55+": 6504
       }}}}}
```

In such a case, a marketing system 310 may target a consumer population having an age of 35 years or older, irrespective of gender.

Figure 3C:
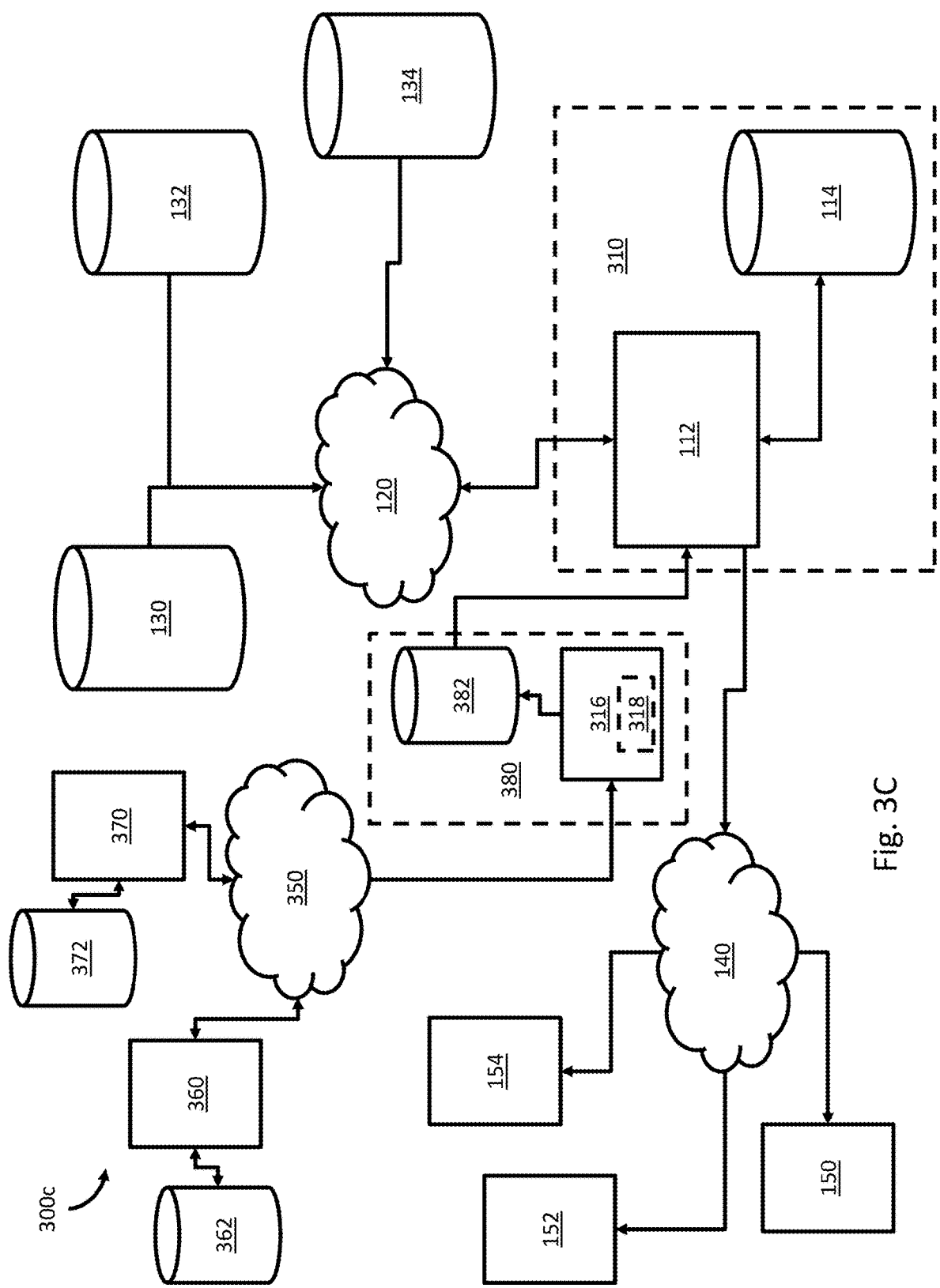

In the embodiment shown in FIG. 3A, the marketing system 310 includes the same or similar components of the marketing system 110 shown in FIG. 1, but also includes the real-time capture system 316. Other embodiments may comprise alternative configurations. For example, in the embodiment shown in FIG. 3, the real-time capture system 316 is defined within a software module separate from, but interfaced with the remainder of the marketing system 310, including marketing system tools 112 and the data store 114. In other embodiments, the real-time capture system 316 may be entirely separate from the marketing system 310. FIG. 3C shows one such embodiment.

In the embodiment shown in FIG. 3C, the marketing system 310 is separate from the real-time capture and storage system 380, which includes a real-time capture system 316 and a real-time storage system 382. In such an embodiment, the real-time capture and storage system 380 may be operated by a different entity than the entity that operates the marketing system 310. For example, a data analytics company may operate a real-time capture and storage system 380 and provide access, such as through a subscription service, to a marketing organization. The marketing organization's marketing system 310 may then request information from the real-time capture and storage system 380, such as for use in planning, executing, or tracking a marketing campaign. Still further configurations are contemplated within the scope of this disclosure.

Figure 4:
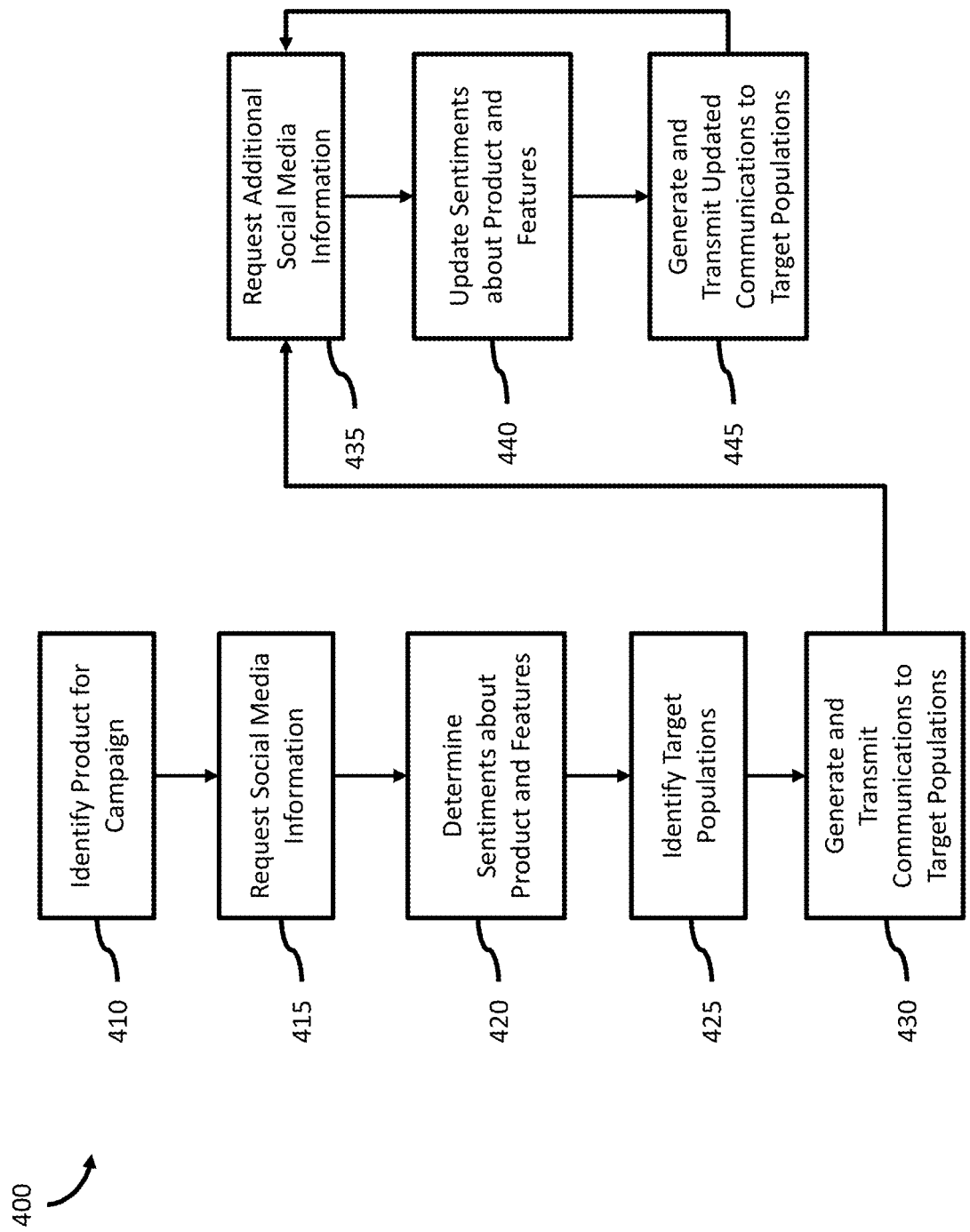
FIG. 4 shows a method for providing real-time marketing campaigns according to certain exemplary embodiments.

FIG. 4 is a flowchart of a method 400 according to certain exemplary embodiments. FIG. 4 is described with respect to a software application executed by the system 310 shown in FIG. 3A; however, the methods disclosed herein are not limited to execution by only the system 310 shown in FIG. 3A, but rather may be executed by any suitable system according to this disclosure. In addition, the method 400 of FIG. 4 will be discussed with respect to marketing a new camera product having a 24 megapixel image sensor, video and audio recording capabilities, and WiFi functionality.

The method 400 begins in block 410 when a marketer uses a marketing system to identify a target product for a marketing campaign. For example, a user may employ a marketing system 310 to plan a new marketing campaign. To do so, the user may employ a planning tool 112-1 to select a product, or multiple products, for the marketing campaign from an available pool of products, such as in a drop-down menu list or from a group of icons representing available products. In some embodiments, a planning tool 112-1 may receive information from an external system, such as in an electronic file, that identifies one or more products for a marketing campaign.

In some embodiments, the identified product may have associated information stored within the marketing system 310, such as information about one or more features of the product, on-sale dates for the product, available marketing offers for the product (e.g. rebates or coupons), or other relevant information. In one such embodiment, identifying the product includes identifying one or more features of the product. For example, if a user of the marketing system 310 uses a planning tool 112-1 to identify a product or products for a marketing campaign, she may also select one or more features or associated keywords of the identified product to incorporate into the marketing campaign. For example, if the user selects a camera product, she may also select one or more keywords associated with features of the product, such as "image sensor resolution," "WiFi capabilities," or "video recording capabilities," to incorporate into the marketing campaign.

In response to identifying a target product, the marketing system 310 in this embodiment may store the identified target product (or products), as well as any identified features of the target product as a part of the marketing campaign. For example, the user may use the planning tool 112-1 to create a new marketing campaign and the target product may be associated with the new marketing campaign, such as by saving a configuration file for the marketing campaign or by storing an association between the new marketing campaign and the target product in the data store 114.

In the embodiment shown in FIG. 4, after a target product has been identified, the method proceeds to block 415.

In block 415, the real-time capture system 316 is executed to request and receive information from one or more social media sites 360, 370, the information associated with user comments about the target product. For example, after the user has identified the target product in block 410, the planning tool 112-1 may communicate with the real-time capture system 316 to provide information about the target product (or products), including any identified features of the target product(s). In some embodiments, the planning tool 112-1 may also seek additional information from the user, such as an identification of one or more social media sites 360, 370. However, in some embodiments, the real-time capture system 316 may be pre-configured to communicate with one or more social media sites 360, 370.

After receiving information about the target product(s) and any identified features of the target product(s), the real-time capture system 316 generates and transmits a request to one or more social media sites 360, 370 for information associated with user comments about the target product. For example, in one embodiment, the real-time capture system 316 may generate and transmit a message to an API for a social media site 360, 370. Such requests may be formatted according to the API for the social media site, and may include information about the target product(s), the identified feature(s), and other information provided by the planning tool 112-1 or the user. For example, the user may elect to seek information about a particular demographic group, such as all females between the ages of 13-34. In such an embodiment, the real-time capture system 316 may transmit a request that identifies at least the demographic information. In some embodiments, however, the real-time capture system 316 may not identify the identified demographic information in the query, but instead may filter information received from the social media site 360, 370 based on the particular demographic information.

After requesting the information from the social media site 360, 370, the real-time capture system 316 receives information from the social media site, the information associated with user comments about the target product. For example, in one embodiment, the real-time capture system 316 receives one or more files comprising copies of user comments about the target product. In another embodiment, the real-time capture system 316 receives statistical information regarding comments about the target product. For example, in the embodiment discussed above, a real-time capture system 316 may receive statistical information about the demographic groups' comments about a target product. Some embodiments may provide sentiment information regarding the target product. In some embodiments, the real-time capture system 316 may identify the type of information to be received, such as copies of the user comments or statistical information. Alternatively, the information received from the social media site(s) 360, 370 may include a combination of different types of information, such as copies of user comments, statistical information, sentiment information, or other types of information made available by a social media site 360, 370, such as through one or more APIs.

After receiving the information from the social media site 360, 370, the method 400 continues to block 420.

At block 420 a sentiment engine 318 is executed to determine sentiments associated with the information received from the social media site 360, 370. In addition, in some embodiments, at block 420, the marketing system 310 identifies one or more features of the target product associated with the sentiments. For example, user comments may be analyzed by a sentiment engine 318 or other suitable function to determine sentiments associated with each of the user comments. In some embodiments, the marketing system 310 may analyze a sentiment for the entirety of a user comment. For example, a user comment may be determined to have a positive sentiment as a whole, without determining whether there are also associated negative sentiments. One example may be a comment stating "XYZ camera is great! I love the great pictures it takes, though the WiFi functionality is buggy." A sentiment engine 318 may determine and associate a positive sentiment with the user comment, despite the negative sentiment associated with the WiFi functionality. However, in some embodiments, a sentiment engine 318 determines multiple sentiments associated with a user comment.

FIG. 5 shows a determination of multiple sentiments of user comments. In this embodiment, the marketing system 310 is capable of analyzing phrases or words within a user comment to identify sentiment associated with those words or phrases. As may be seen in FIG. 5, the marketing system 310 is able to determine negative sentiments associated with audio quality of the video recording capabilities of the cameras, but is also able to determine positive sentiments associated with other features of the camera, or of the camera as a whole. Thus, the marketing system 310 is able to identify that sentiment about the cameras is generally positive, but sentiment about the cameras' audio recording capabilities is negative. Such finer-grained sentiment determination may aid in planning a marketing campaign or selecting a target population.

For example, if a particular demographic group is providing negative comments about the audio recording quality, a marketer or marketing organization may exclude information about the audio recording features of the camera when creating marketing materials for that demographic, or may exclude that demographic from a particular marketing campaign. Or the marketer may simply avoid mentioning the audio recording features at all when planning a marketing campaign.

In the embodiments shown in FIGS. 3A and 3C, the real-time capture system 316 comprises a sentiment engine 318 and thus performs the step of determining sentiments associated with the user comments about the target product. However, in some embodiments, sentiment analysis may be performed by other components of the marketing system 310 or of the overall system 300A or 300C. For example, in some embodiments, the planning tool 112-1 of the marketing system 310 may be configured to determine sentiments associated with the user comments about the target product. In some embodiments, other modules of the marketing system 310 may be configured to determine sentiments associated with the user comments about the target product. And in some embodiments, the marketing system 310 may not determine sentiments associated with user comments. In such embodiments, a marketing system 310 may be used to plan a marketing campaign based on other information, such as by targeting demographic groups having a high rate of discussion of a product.

Sentiment information may be used to rank certain keywords, such as those associated with a target product or its features, for use in a marketing campaign. Embodiments of the present invention may employ ordered or ranked lists of keywords according to sentiments, which may be further subdivided by demographic categories, including having different keyword rankings for different demographic categories. In one embodiment, for example, a marketing system 310 may employ a sentiment engine 318 to determine relevancy and sentiment scores for different keywords or phrases. For example, in the embodiment shown in FIG. 5, the sentiments and relevance scores for a number of keywords are provided. These scores may be calculated for individual uses of a keyword, and also aggregated across multiple uses.

One embodiment according to this disclosure determines sentiment scores for each use of a keyword in a user comment and averages the individual sentiment scores to determine a total sentiment score for the keyword. Thus, a sentiment score for a particular keyword may be calculated based on the sum of all sentiment scores divided by the number of posts or user comments using the keyword. This calculation may be performed for each keyword, and the keywords and associated average sentiment scores may be ordered in a list or table, such as in order of highest average sentiment score to lowest. And in some embodiment, keywords with negative sentiment scores may be deleted from the list or table. Some embodiments may also weight sentiment scores, such as by the frequency at which a keyword is used. For example, in one embodiment, the average sentiment score for each keyword of interest is multiplied by the number of user comments or posts in which the keyword was used. The list or table of keywords may then be ordered according to the weighted sentiment score.

In addition, when generating such an ordered list, some embodiments may generate multiple lists, each including some portion (or all) of the keywords, according to different demographic groups. Because different demographic groups may have different sentiments about the same product or features (as represented by keywords), the use of multiple ordered lists may be of significant value. In one such embodiment, average sentiment scores are only calculated for a particular list by using sentiment scores of user comments or posts from the respective demographic group. Thus, comments posted by a 15-year-old may have no impact on sentiment rankings for a demographic group including only 35-54 year-olds.

The marketing system 310 may then store the sentiments in the data store 114 and, according to different embodiments, may update those scores from time to time as additional user comments or posts are acquired.

After determining sentiments, the method 400 proceeds to block 425.

In block 425, the marketer uses a planning tool of the marketing system 310 to identify a target population for the marketing campaign based on the information. For example, in one embodiment, the marketing system 310 analyzes sentiments based on user comments received from one or more social media sites 360, 370 and identifies one or more demographic populations associated with the comments. As discussed above, in some embodiments, a social media site 360, 370 may provide statistical demographic information. For example, if a substantial number of comments about a new product are generated by consumers in the 13-34 year-old age group, a marketing campaign may target this demographic population. Alternatively, if a 55+ year-old age group has very few comments about a new product, it may be desirable to target this population to increase awareness of the product. And subsequent iterations of the method 400, as will be described in more detail below with respect to real-time or near-real-time aspects, may affect the communications sent to the targeted population.

For example, if a population has made relatively few comments on social media sites 360, 370 regarding a new product, that group may be targeted for general information or offers about the product. But, subsequent real-time or near real-time analysis of comments over time may indicate an up-tick in comments in this age group, which may result from the initial marketing communications. These new comments may be used to adjust the messages sent to the target population, or to better focus or expand the target population.

In some embodiments, multiple target populations may be targeted. For example, in one embodiment, a marketing system 310 may be configured to send communications to all consumers identified by records in the data store 114. However, to effectively target all of the consumers, the marketing system 310 may generate target populations by subdividing the universe of available consumers into demographic groups based on user comments or sentiments. For example, if a marketing campaign for a new camera is planned to target as many consumers as possible, the marketing system 310 may subdivide the targeted consumers into young, middle-aged, and older populations based on information received from the social media sites 360, 370. If the young population group is actively commenting about the new camera product, the marketing system 310 may generate a target population of 13-34 year olds. If a middle-age population group is discussing the new camera product, but only a particular feature of the camera product, the marketing system may generate a target population of 35-54 year-olds, but qualify the target population as having a particular interest in the new product. Further, if the older population is not commenting often about the new camera product, the marketing system 310 may generate a third target population of 55+ year-olds, and identify the population as needing general information about the product. Some embodiments may generate a target population based on other demographic characteristics, depending on availability of the information, such as gender, marital status, number of children, geographic location, etc.

After selecting a target population, the method 400 proceeds to block 430.

In block 430, the marketing system 310 generates and transmits marketing communications to the target population based on the collected and analyzed information and the sentiments. As discussed above, information received from the social media sites 360, 370 may include user comments, demographic statistics, and other PII. Such information may be used to generate communications calculated to elicit a positive response from the target population.

In some embodiments, the marketing system 310 is configured to automatically generate some or all of the marketing communication. For example, in one embodiment, the marketing system 310 is configured to automatically generate a subject for the marketing communication. In some cases, the subject of the communication can be of particular importance in determining whether a targeted consumer opens a communication. For example, a user may skip over or delete a marketing email with a poor or long subject line. When viewing emails, particularly on a mobile device, a user may quickly skim an email subject to determine whether it is of interest. An email subject that does not begin with an interesting topic or that is too long to fit on a single line may be skipped by the consumer. Thus, in some embodiments, the marketing system 310 is configured to automatically generate subject lines for marketing communications based on product features with high positive sentiments, such as based on an ordered list of keywords as discussed above, for the targeted consumer's demographic group. For example, one embodiment may generate a subject line that says "24 megapixel camera!" based on the target demographic group's positive sentiment about the high-resolution image sensor in the new camera product.

In some embodiments, the marketing system 310 is configured to generate subject lines based on keywords or other content provided to the marketing system 310. For example, as discussed above, a marketer may select keywords for use with a marketing campaign. In one embodiment, the marketing system 310, such as by using the execution tool 112-4, is configured to generate a subject line that is based at least in part on one or more keywords or other content, including graphics, URLs, or other content. For example, in an embodiment, the marketing system 310 may select an MMS messaging channel and may incorporate keywords or images provided to the marketing system 310, such as by a marketer or by a customer of the marketer.

In some embodiments the length of the subject line or the number of features included within the subject may vary based on the channel used to send the communication. For example, for email communications, the marketing system 310 may generate email subject lines about only a single feature having only a small number of words, such as 5 to 7 words. But for a direct mail communication, the marketing system may generate highlighted text for a mailer that includes the top three features by sentiment for the targeted consumer's demographic group. And while in some embodiments the marketing system 310 may automatically generate a subject for a communication, other in other embodiments the marketing system may prompt a marketer to manually enter a subject line. However, in some such embodiments, the marketing system may provide helpful information to the marketer, such as indications of features and associated sentiments based on demographic groups, and an expected or suggested maximum length for a subject line.

Figure 6A:
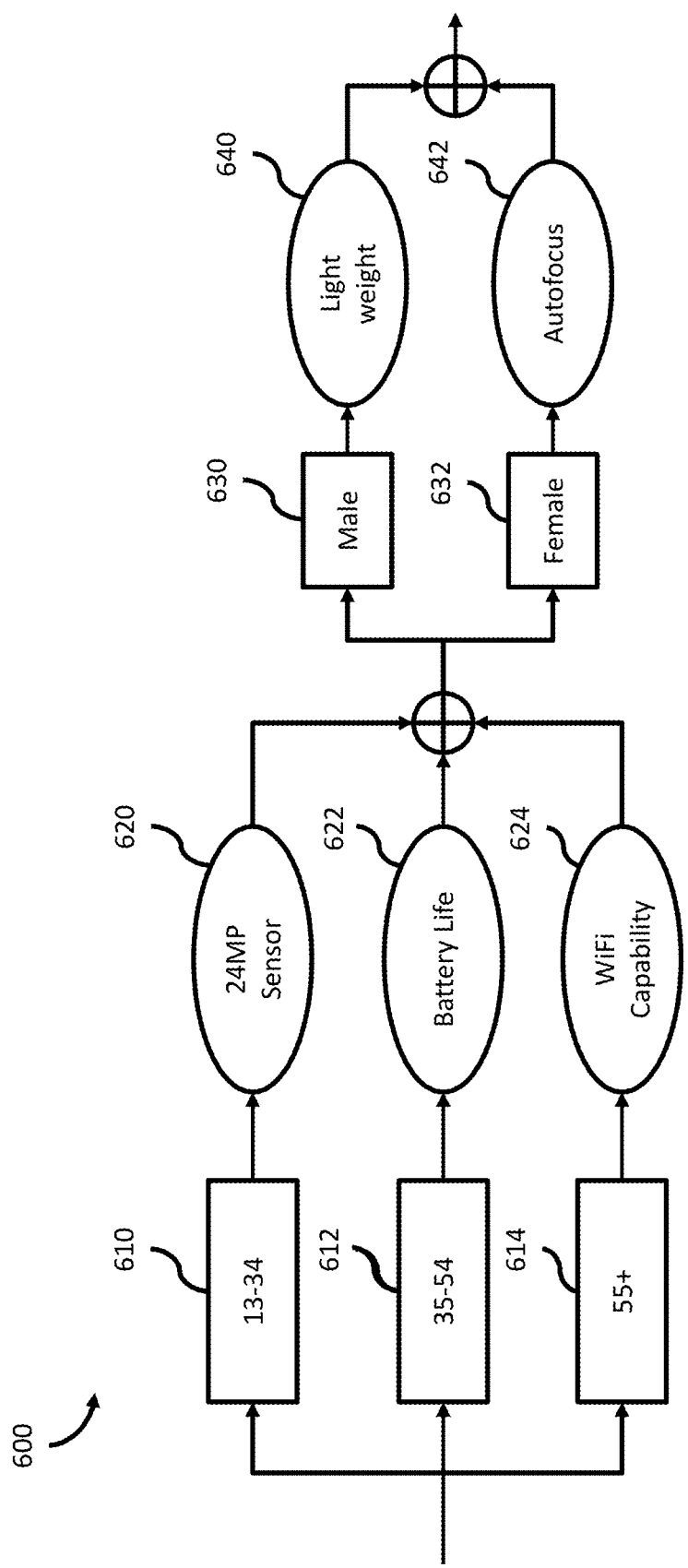
FIGS. 6A-C show process flows for generating marketing communications according to certain exemplary embodiments.

FIG. 6A shows a process flow 600 for generating a marketing communication according to certain embodiments. In the example shown in FIG. 6, six target populations have been identified based on age and gender. According to this embodiment, the marketing system 310 is configured to generate email communications to be transmitted to the various target populations. To generate emails appropriate to each of the target populations, the marketing system 310 first determines for which age group to generate an email communication. In this embodiment, three age group populations 610, 612, 614 have been generated by the marketing system 310. For purposes of this example, the marketing system 310 generates an email communication directed to 13-34 year-old females.

As the marketing system 310 generates an email communication for the first age group 610 the marketing system 310 is provided with information 620 indicating that the first age group 610 has positively commented about the new camera product's 24 megapixel image sensor. Therefore, the marketing system 310 generates a subject line for the email communication that emphasizes the 24 megapixel sensor. The marketing system 310 then proceeds to the next attribute of the target population, the gender, and in this case, is generating an email communication to female consumers 632. The marketing system 310 then determines that this target population 632 has commented positively about autofocus features of the new camera product, and updates the subject line for the email communication to add information about autofocus capabilities and incorporates content including, in this example, one or more URLs linked to dynamic content relating to the new camera product. After traversing the process flow 600, the marketing system 310 has generated an email marketing communication to 13-34 year-old female consumers that emphasize two product features of interest to that demographic. The marketing system 310 will then traverse each of the potential paths of the process flow 600 that are applicable to the target population for a marketing campaign. Thus, when generating marketing communications directed to consumers in the 35-54 year-old age group, the marketing system 310 in one embodiment will traverse block 612 of the process flow 600 and create a marketing communication with an email communication that emphasizes the battery life 622 of the camera. It will then traverse the appropriate path based on gender, whether 630 or 632, to generate an appropriate marketing communication. Thus, by executing the process flow 600, the marketing system 310 may generate up to six different types of marketing communications: one for each of the age groups 610, 612, and 614, and for each age group, two different types based on gender 630, 632. For each targeted consumer, the marketing system 310 may then select the appropriate marketing communication for the respective consumer based on the consumer's age and gender.

In this example, the product features having positive sentiment amongst the target population are incorporated into the subject of the email communication. Such a strategy may encourage more recipients of the communication to open the email as it places relevant, enticing information in a location that is likely to be viewed by the target population. In addition, the marketing system 310 incorporates additional product information into the body of the email communication, such as additional features of the product and one or more URLs that dynamically incorporate graphics or other information about the product, as well as one or more URLs to web pages at which to purchase the new product.

Figure 6B:
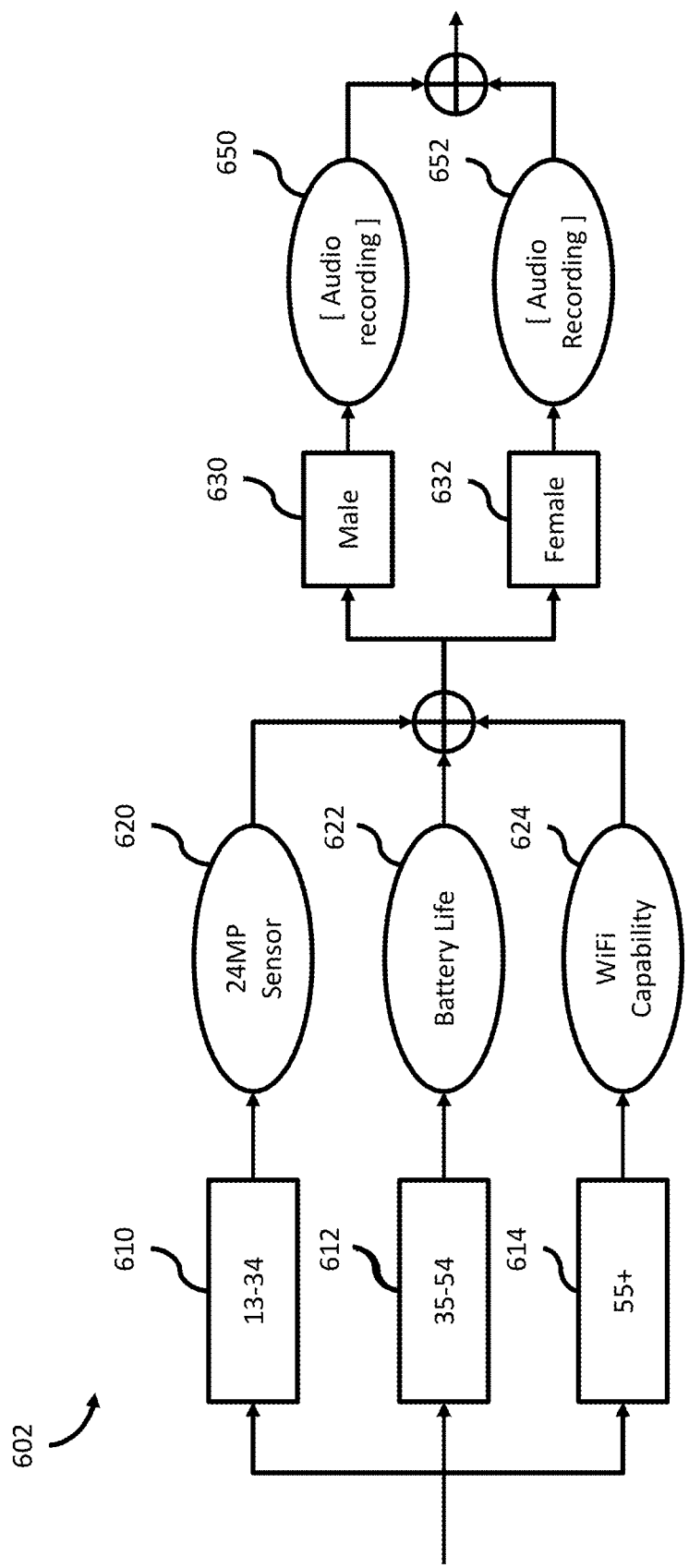

FIG. 6B shows another process flow 602 according to certain exemplary embodiments. In the process flow 602 shown in FIG. 6B, the marketing system 310 again has multiple target populations and is similar to the process flow 600 shown in FIG. 6A. However, in this example, terms having negative sentiment are incorporated into the process flow. In this embodiment, the "audio recording" term has a negative sentiment associated with it for both male and female target populations, with the negativity of the sentiment denoted by square brackets ([ ]). Thus, as the marketing system 310 processes the user information and sentiments to generate communications to the respective target populations, upon reaching blocks 650 or 652, the marketing system 310 will either remove content relating to an audio recording feature of the camera product from the communication, or will flag such content to be excluded from communications to be generated once the process flow has been completed. Thus, in some embodiments, the marketing system 310 is configured to emphasize features having associated positive sentiment and to deemphasize features having associated negative sentiment for the target population. In some embodiments, the marketing system 310 may entirely omit such features from a marketing communication, while in other embodiments, it may only include a brief mention of the feature in a feature list or otherwise deemphasize the feature. Thus, in some embodiments, the marketing system 310 may deemphasize, by omitting or reducing a relative emphasis of a feature to other features, or by increasing the emphasis on other features relative to the feature having the negative associated sentiment.

And, in some embodiments, depending on the configuration of a process flow, certain features may have an associated positive sentiment for one target population but have an associated negative sentiment for a different target population. For example, a small size of a camera may have a positive associated sentiment for an older target population, but have a negative associated sentiment for a younger male target population.

As discussed above with respect to FIG. 6A, the marketing system 310 will then traverse each of the potential paths of the process flow 602 that are applicable to the target population for a marketing campaign. Thus, when generating marketing communications directed to consumers in the 35-54 year-old age group, the marketing system 310 in one embodiment will traverse block 612 of the process flow 600 and create a marketing communication with an email communication that emphasizes the battery life 622 of the camera. It will then traverse the appropriate path based on gender, whether 630 or 632, to generate an appropriate marketing communication. Thus, by executing the process flow 610, the marketing system 310 may generate up to six different types of marketing communications: one for each of the age groups 610, 612, and 614, and for each age group, two different types based on gender 630, 632. For each targeted consumer, the marketing system 310 may then select the appropriate marketing communication for the respective consumer based on the consumer's age and gender.

In addition to the content to be viewed by the target population, in some embodiments the marketing system 310 also may embed tracking functionality into the email communication. Such information, such as URLs, may cause tracking information to be sent to the marketing system 310 upon the occurrence of certain activities. For example, some embodiments may incorporate tracking functionality into an email communication to send a notification to the marketing system 310 if the user opens the email communication. In some embodiments, the marketing system 310 may incorporate URLs to information websites or websites that sell the product, where these URLs include functionality to send tracking information to the marketing system 310 indicating that the consumer has clicked on one or more of the URLs. Further, these websites may incorporate additional tracking functionality to send tracking information to the marketing system 310 based on actions taken by the consumer on the respective website, including which links the user selects, whether the user purchase the product, whether the user purchases a competitor product, or whether the user cancels a purchase before completion.

In some of the embodiments discussed above, the marketing communication comprises an email communication. However, in some embodiments, other types of communications may be created and transmitted. As discussed above, in some embodiments, the marketing system 310 comprises a data store 114 that may include information regarding different consumers. Some of the stored information may include preference information regarding desired and disfavored forms of communication. For example, consumer profiles stored in a data store 114 may comprise information regarding the profiled consumers' preferences for email communications, postal mail communications, Tweets®, SMS or MMS messages, social media messages (e.g. Facebook® status updates or private messages), etc. Embodiments according to this disclosure may generate communications based on the target population's, or even individual targeted consumers', preferences. In some embodiments, multiple different communications channels may be used simultaneously, or may reference each other. For example, in one embodiment, the marketing system 310 may generate an email message and a Facebook® message on the user's Facebook® timeline, where the email message provides a URL to Facebook® and a message to view a promotional offer available through Facebook®. Thus, the marketing system 310 may be configured to generate and transmit a wide variety of marketing communications.

After the marketing system 310 has generated and transmitted the communication, the method 400 proceeds to block 435.

In block 435, the marketing system 310 requests additional information from the one or more social media sites 360, 370, the additional information associated with user comments about the target product. In the example of FIG. 4, the marketing system 310 is configured to request additional information from the one or more social media sites 360, 370 from which information was requested in block 415. The additional information may comprise updated information in response to the marketing system 310 sending an identical request to the social media site 360, 370, or may be in response to different requests. In some embodiments, the request may be for only updated information, such as new statistical information during the time period between the previous request and the new request.

After the marketing system 310 requests the additional information, the method 400 proceeds to block 440.

In block 440, the marketing system 310 determines updated sentiments associated with the additional user comments about the target product. The marketing system 310 may be configured, according to some embodiments, to request additional information from the one or more social media sites 360, 370 to determine whether consumer sentiments regarding the target product have changed over time or if different features of the target product are the subject of comments. For example, in the example shown in FIG. 5, the audio recording quality of the target product had an associated negative sentiment. However, if the product is updated, such as via a software patch, to improve the audio recording quality of the target product, consumer sentiment regarding the feature may change. Thus, by requesting additional information from the one or more social media sites 360, 370, the marketing system 310 may be able to update a process flow, such as process flow 602, for generating and transmitting communications to the target population.

Figure 6C:
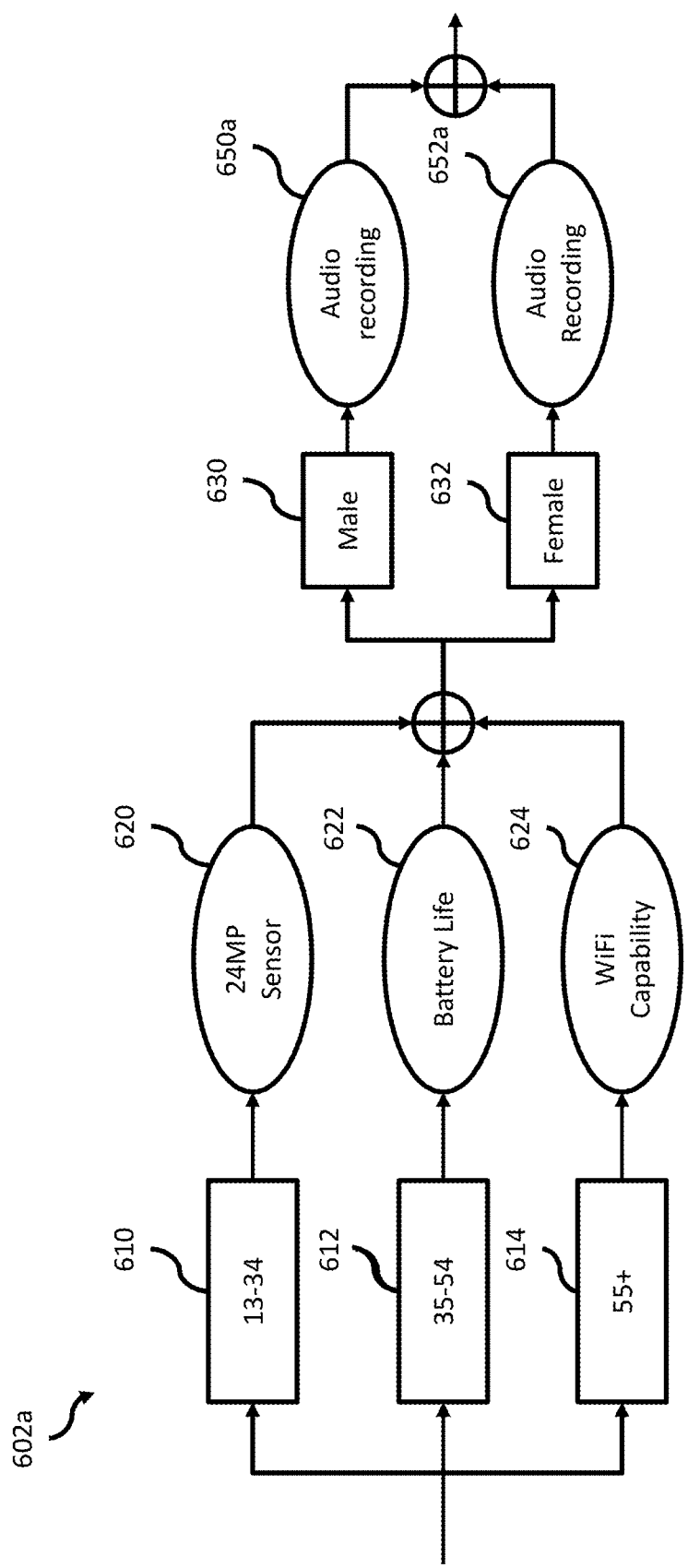

For example, referring to FIG. 6C, after requesting additional information from the one or more social media sites 360, 370, the marketing system 310 updates process flow 602, shown in FIG. 6B, to create process flow 602a. The process flow 602a in FIG. 6C reflects a change in sentiment regarding the audio recording feature of the target product (a camera product). As may be seen in FIG. 6C, the audio recording feature 650a, 652a is now a feature to be emphasized, as indicated by the lack of square brackets found in the process flow 602 of FIG. 6B. Thus, by requesting additional information from the one or more social media sites 360, 370, the marketing system 310 is able to dynamically alter sentiment information associated with the target product or features of the target product.

After the marketing system 310 determines updated sentiments, the method proceeds to block 445.

In block 445, the marketing system 310 generates and transmits updated marketing communications based on the additional information and the updated sentiments. As discussed above, the marketing system 310 can be configured to generate communications based on information received from social media websites 360, 370 as well as sentiment information generated based on the received information. Such information can be used to generate process flows, such as process flows 600, 602, 602a, for generating communications to one or more target populations. Following the receipt of additional information and the determination of updated sentiment information, the marketing system 310 can generate and transmit communications based on this additional information and the updated sentiment information. For example, referring again to FIG. 6C, an updated process flow 602a may be generated based on the updated sentiment information, and the marketing system according to one such embodiment generates and transmits communications based on the updated process flow 602a. In this embodiment, the marketing system 310 employs the process flow 602a in FIG. 6C as was discussed with respect to FIG. 6A or 6B.

For example, the marketing system 310 may be able to alter a targeted advertisement on Facebook® to emphasize a feature of product based on changed sentiment such that when a targeted consumer next logs into their Facebook® account, she may be presented with an updated communication that emphasizes the feature. Thus, it may be possible to present targeted consumers with relevant, targeted communications that reflect consumer sentiment and emphasize a target product, or features of a target product, to a relevant target population, in a communications channel of interest to that target population, and emphasizing (or deemphasizing) features of the target product according to the target population's determined sentiment towards the target product or feature(s).

Thus, in some embodiments, the marketing system 310 is able to dynamically alter a marketing campaign according to changing consumer sentiment about the target product or particular features of the target product. Such a system may provide a more effective mechanism for targeting an appropriate population and for providing more relevant and enticing marketing communications to that target population over time.

While the methods and systems herein are described in terms of software executing on various machines, the methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor.

The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method for automating generation of customized electronic content based on sentiment data obtained via system-to-system communication with social media sites, the method comprising:

generating and scoring, by a marketing system, sentiment information used for generating the electronic content, wherein generating and scoring the sentiment information comprises:

(a) identifying, by the marketing system, a first feature of a target product for a marketing campaign, a second feature of the target product for the marketing campaign, and a third feature of the target product, wherein identifying the first feature, the second feature, and the third feature comprises:

presenting a graphical user interface having a menu for selecting the target product from a set of products, receiving, via the menu, a selection of the target product, accessing an electronic file matching the selection, and retrieving data describing the first feature, the second feature, and the third feature from the electronic file;

(b) executing, by a real-time capture engine of the marketing system, an algorithm that obtains user comment information from the social media sites by generating messages formatted for application programming interfaces of the social media sites and obtaining the user comment information through communications of the messages over a data network and via the application programming interfaces, wherein executing the algorithm that obtains the user comment information comprises, for each social media site:

identifying a function call from a particular application programming interface of the social media site, identifying data parameters used in the function call and a data source parameter used in the function call, generating a function call instance having data parameter values usable by the marketing system to generate the electronic content and a data source parameter value specifying a particular data source hosted by the social media site, the data parameter values identifying the target product and one or more of the first feature, the second feature, and the third feature, transmitting the function call to the social media site, and receiving a response from the social media site that is formatted according to the particular application programming interface, (c) executing a sentiment engine to automatically compute, from the user comment information, a first sentiment score for the first feature, a second sentiment score for the second feature, and a third sentiment score for the second feature, wherein the first sentiment score and the second sentiment score are determined to be greater than the third sentiment score based on a negative sentiment toward the third feature being indicated by the user comment information, and (d) increasing, by the marketing system, the first sentiment score to be greater than the second sentiment score based on a number of comments or posts, which are described in the obtained user comment information, involving a sentiment used to generate the first sentiment score, generating, by an execution tool of the marketing system and based on the first sentiment score being greater than the second sentiment score and the third sentiment score, the electronic content by (i) retrieving electronic information corresponding to the first feature of the target product rather than the second feature and the third feature of the target product, the electronic information associated with a target population for the marketing campaign, and (ii) inserting the retrieved electronic information that into the electronic content, wherein generating the electronic content comprises:

modifying a subject of the electronic content to include the retrieved information describing the first feature;

adding, to a body of the electronic content, a feature hyperlink configured for dynamically displaying graphics depicting the first feature; and adding, to the electronic content, a tracking hyperlink configured for navigating to a webpage featuring the targeted product and for causing a tracking server to transmit, to the marketing system, visit data describing interactions with the webpage that are initiated via the tracking hyperlink; and transmitting, by the execution tool, marketing communications with the electronic content to the target population.

2. The method of claim 1, further comprising:

requesting and receiving, by the real-time capture engine, additional user comment information from the social media sites, the additional user comment information associated with additional user comments about the target product;

determining, by the sentiment engine of the marketing system and from the additional user comment information, an update to one or more of the first sentiment score, the second sentiment score, and the third sentiment score; and generating and transmitting, by the execution tool, updated marketing communications based on the update to the one or more of the first sentiment score, the second sentiment score, and the third sentiment score.

3. The method of claim 1, wherein the subject is further generated based on at least a keyword or other content provided to the marketing system.

4. The method of claim 1, further comprising:

determining, by a planning tool of the marketing system, first demographic information associated with the user comment information;

determining, by the planning tool, second demographic information associated with the target population; and determining, by the sentiment engine of the marketing system, sentiments associated with the first demographic information associated with the user comment information, wherein generating the electronic content for the marketing communications is further based at least in part on the first demographic information associated with the target population and the second demographic information associated with the user comment information.

5. The method of claim 1, further comprising providing, by a planning tool of the marketing system, a graphical representation of one or more demographic groups of the target population and updated product information relevant to the one or more demographic groups based on the user comment information;

orchestrating, with the marketing system, the marketing campaign in real time based on a selection of updated target product information and a selection of a demographic group; and providing the selected updated target product information and the selected demographic group to the execution tool of the marketing system, wherein generating the marketing communications is based on the selected updated target product information and the selected demographic group.

6. The method of claim 1, further comprising:

determining, by the execution tool of the marketing system, a process flow associated with the marketing campaign, the process flow comprising different paths based on demographic information relating to the target population, and traversing, by the execution tool, the process flow according to the demographic information of the target population to generate the marketing communications.

7. The method of claim 1, wherein the marketing communications comprise dynamic content and further comprising generating and transmitting updated marketing communications by modifying the dynamic content based on updated sentiments determined by the marketing system.

8. The method of claim 1, further comprising:

determining, by the sentiment engine of the marketing system, words or phrases in the user comment information having positive sentiments and negative sentiments; and determining, by a planning tool of the marketing system, features of the target product associated with the words or phrases;

determining, by the planning tool, a ranking of the features of the target product based on the positive sentiments; and storing, by the marketing system, the ranking of the features, the positive sentiments, and the negative sentiments.

9. The method of claim 1, further comprising determining, by a planning tool, frequency information associated with one or more features of the target product based on the user comment information.

10. The method of claim 9, further comprising:

determining, by the sentiment engine of the marketing system, words or phrases in the user comment information having positive sentiments and negative sentiments; and determining, by the planning tool of the marketing system, features of the target product associated with the words or phrases;

determining, by the planning tool, a ranking of the features of the target product based on the positive sentiments and the frequency information; and storing, by the marketing system, the ranking of the features, the positive sentiments, and the negative sentiments.

11. The method of claim 1, further comprising:

determining, by the sentiment engine, words or phrases of the user comment information having negative sentiments; and determining, by a planning tool, features of the target product associated with the words or phrases; and wherein generating the electronic content for the marketing communications comprises excluding the words or phrases having the negative sentiments.

12. A system comprising:

a marketing system comprising processor and a non-transitory computer-readable medium storing program code for a planning tool, an execution tool, and a real-time capture engine, the program code for the planning tool, the execution tool, and the real-time capture engine configured to be executed by the processor of the marketing system;

a data store configured to store information related to potential consumers, the data store in communication with the processor of the marketing system;

wherein the marketing system is configured for:

(a) generating and scoring sentiment information used for generating electronic content, wherein generating and scoring the sentiment information comprises:

(i) identifying a first feature of a target product for a marketing campaign, a second feature of the target product for the marketing campaign, and a third feature of the target product, wherein identifying the first feature, the second feature, and the third feature comprises:
  presenting a graphical user interface having a menu for selecting the target product from a set of products,
  receiving, via the menu, a selection of the target product,
  accessing an electronic file matching the selection, and
  retrieving data describing the first feature, the second feature, and the third feature from the electronic file;
(ii) executing, by the real-time capture engine, an algorithm that obtains user comment information from social media sites by generating messages formatted for application programming interfaces of the social media sites and obtaining the user comment information through communications of the messages over a data network and via the application programming interfaces, wherein executing the algorithm that obtains the user comment information comprises, for each social media site:
  identifying a function call from a particular application programming interface of the social media site,
  identifying data parameters used in the function call and a data source parameter used in the function call,
  generating a function call instance having data parameter values usable by the marketing system to generate the electronic content and a data source parameter value specifying a particular data source hosted by the social media site, the data parameter values identifying the target product and one or more of the first feature, the second feature, and the third feature,
  transmitting the function call to the social media site, and
  receiving a response from the social media site that is formatted according to the particular application programming interface,
(iii) executing a sentiment engine to automatically compute, from the user comment information, a first sentiment score for the first feature, a second sentiment score for the second feature, and a third sentiment score for the second feature, wherein the first sentiment score and the second sentiment score are determined to be greater than the third sentiment score based on a negative sentiment toward the third feature being indicated by the user comment information, and
(iv) increasing, by the marketing system, the first sentiment score to be greater than the second sentiment score based on a number of comments or posts, which are described in the obtained user comment information, involving a sentiment used to generate the first sentiment score,
(b) generating, by the execution tool and based on the first sentiment score being greater than the second sentiment score and the third sentiment score, the electronic content by (i) retrieving electronic information corresponding to the first feature of the target product rather than the second feature and the third feature of the target product, the electronic information associated with a target population for the marketing campaign, and (ii) inserting the retrieved electronic information that into the electronic content, wherein generating the electronic content comprises:
  (i) modifying a subject of the electronic content to include the retrieved information describing the first feature,
  (ii) adding, to a body of the electronic content, a feature hyperlink configured for dynamically displaying graphics depicting the first feature, and
  (iii) adding, to the electronic content, a tracking hyperlink configured for navigating to a webpage featuring the targeted product and for causing a tracking server to transmit, to the marketing system, visit data describing interactions with the webpage that are initiated via the tracking hyperlink; and
(c) transmitting, by the execution tool, marketing communications with the electronic content to the target population.

13. The system of claim 12, wherein the marketing system is further configured for:
  using the real-time capture engine to request and receive additional user comment information from the social media sites, the additional user comment information associated with additional user comments about the target product;
  determining, from the additional user comment information, an update to one or more of the first sentiment score, the second sentiment score, and the third sentiment score; and
  generating and transmitting, with the execution tool, updated marketing communications based on the update to the one or more of the first sentiment score, the second sentiment score, and the third sentiment score.

14. The system of claim 12, wherein the marketing communications comprise dynamic content, and wherein generating and transmitting updated marketing communications comprises modifying the dynamic content based on updated sentiments determined for the target product.

15. The system of claim 12, wherein the marketing system is further configured for:
  determining, with the planning tool, first demographic information associated with the user comment information and second demographic information associated with the target population; and
  determining sentiments associated with the first demographic information associated with the user comment information,
  wherein generating the electronic content for the marketing communications is further based at least in part on the first demographic information associated with the target population and the second demographic information associated with the user comment information.

16. The system of claim 12, wherein the marketing system is further configured for determining words or phrases of the user comment information having negative sentiments;
  wherein the planning tool is further configured to determine features of the target product associated with the words or phrases;
  wherein the execution tool is further configured to exclude the words or phrases having negative sentiments.

17. A non-transitory computer-readable medium having program code stored thereon and executable by a processor of a marketing system to perform operations, the operations comprising:
  generating and scoring sentiment information used for generating electronic content, wherein generating and scoring the sentiment information comprises:
    (a) identifying a first feature of a target product for a marketing campaign, a second feature of the target product for the marketing campaign, and a third feature of the target product, wherein identifying the first feature, the second feature, and the third feature comprises:
      presenting a graphical user interface having a menu for selecting the target product from a set of products,
      receiving, via the menu, a selection of the target product,
      accessing an electronic file matching the selection, and
      retrieving data describing the first feature, the second feature, and the third feature from the electronic file,
    (b) executing a data-capture algorithm that obtains user comment information from social media sites by generating messages formatted for application programming interfaces of the social media sites and obtaining the user comment information through communications of the messages over a data network and via the application programming interfaces, wherein executing the data-capture algorithm that obtains the user comment information comprises, for each social media site:
      identifying a function call from a particular application programming interface of the social media site,
      identifying data parameters used in the function call and a data source parameter used in the function call,
      generating a function call instance having data parameter values usable by the marketing system to generate the electronic content and a data source parameter value specifying a particular data source hosted by the social media site, the data parameter values identifying the target product and one or more of the first feature, the second feature, and the third feature,
      transmitting the function call to the social media site, and
      receiving a response from the social media site that is formatted according to the particular application programming interface,
    (c) executing a sentiment engine to automatically compute, from the user comment information, a first sentiment score for the first feature, a second sentiment score for the second feature, and a third sentiment score for the second feature, wherein the first sentiment score and the second sentiment score are determined to be greater than the third sentiment score based on a negative sentiment toward the third feature being indicated by the user comment information, and
    (d) increasing, by the marketing system, the first sentiment score to be greater than the second sentiment score based on a number of comments or posts, which are described in the obtained user comment information, involving a sentiment used to generate the first sentiment score,
  generating, based on the first sentiment score being greater than the second sentiment score and the third sentiment score, the electronic content by (i) retrieving electronic information corresponding to the first feature of the target product rather than the second feature and the third feature of the target product, the electronic information associated with a target population for the marketing campaign, and (ii) inserting the retrieved electronic information that into the electronic content, wherein generating the electronic content comprises:
    (a) modifying a subject of the electronic content to include the retrieved information describing the first feature;
    (b) adding, to a body of the electronic content, a feature hyperlink configured for dynamically displaying graphics depicting the first feature; and
    (c) adding, to the electronic content, a tracking hyperlink configured for navigating to a webpage featuring the targeted product and for causing a tracking server to transmit, to the marketing system, visit data describing interactions with the webpage that are initiated via the tracking hyperlink; and
  transmitting marketing communications with the electronic content to the target population.

18. The non-transitory computer-readable medium of claim 17, the operations further comprising:
  requesting and receiving, in real time and by executing the data-capture algorithm, additional user comment information from the social media sites, the additional user comment information associated with additional user comments about the target product;
  determining, from the additional user comment information, an update to one or more of the first sentiment score, the second sentiment score, and the third sentiment score; and
  generating and transmitting updated marketing communications based on the update to the one or more of the first sentiment score, the second sentiment score, and the third sentiment score.

* * * * *